United States Patent
Incesu et al.

(10) Patent No.: US 9,712,818 B2
(45) Date of Patent: Jul. 18, 2017

(54) METHOD FOR STABILIZING A FIRST SEQUENCE OF DIGITAL IMAGE FRAMES AND IMAGE STABILIZATION UNIT

(71) Applicant: Sony Corporation, Minato-ku (JP)

(72) Inventors: Yalcin Incesu, Stuttgart (DE); Felix Raimbault, Osmoy (FR)

(73) Assignee: SONY CORPORATION, Tokyo (JP)

( * ) Notice: Subject to any disclaimer, the term of this patent is extended or adjusted under 35 U.S.C. 154(b) by 531 days.

(21) Appl. No.: 14/109,139

(22) Filed: Dec. 17, 2013

(65) Prior Publication Data

US 2014/0198852 A1    Jul. 17, 2014

(30) Foreign Application Priority Data

Jan. 11, 2013    (EP) .................................... 13000144

(51) Int. Cl.

| | | |
|---|---|---|
| *H04N 19/00* | (2014.01) | |
| *H04N 19/51* | (2014.01) | |
| *H04N 19/513* | (2014.01) | |
| *H04N 19/527* | (2014.01) | |
| *H04N 19/533* | (2014.01) | |

(52) U.S. Cl.
CPC ..... *H04N 19/00684* (2013.01); *H04N 19/513* (2014.11); *H04N 19/527* (2014.11); *H04N 19/533* (2014.11)

(58) Field of Classification Search
CPC .... H04N 5/228; H04N 5/23267; H04N 5/145; H04N 5/23254; G06T 5/002; G06T 2207/20182; G06T 7/2026; G06T 7/2033; G06T 1/20; G06T 7/2073; G06T 2207/10016; G06T 2207/20016; G06T 2207/20; G06K 9/40; G06F 12/0891

See application file for complete search history.

(56) References Cited

U.S. PATENT DOCUMENTS

| | | | | |
|---|---|---|---|---|
| 8,054,335 | B2 | 11/2011 | Deng et al. | |
| 8,849,054 | B2 * | 9/2014 | Liu ........................ | H04N 5/145 348/208.4 |
| 8,891,014 | B2 * | 11/2014 | Derer ...................... | H04L 29/06 348/14.12 |
| 8,896,715 | B2 * | 11/2014 | Wu ..................... | H04N 5/23248 348/208.6 |

(Continued)

OTHER PUBLICATIONS

Homer H. Chen, et al., "Integration of Digital Stabilizer With Video Codec for Digital Video Cameras", IEEE Transactions on Circuits and Systems for Video Technology, vol. 17, No. 7, Jul. 2007, pp. 801-813.

(Continued)

*Primary Examiner* — Frank Huang
(74) *Attorney, Agent, or Firm* — Oblon, McClelland, Maier & Neustadt, L.L.P.

(57) ABSTRACT

A method for stabilizing a first sequence of digital image frames is provided including determining a dominant motion vector of a dominant motion layer of said sequence; determining a first part of the dominant motion vector representative of an intended motion in said sequence; determining a second part of the dominant motion vector representative of an unintended motion in said sequence; and generating a second sequence from the first sequence based on the second part. A corresponding image stabilization unit is provided as well.

7 Claims, 10 Drawing Sheets

(56) References Cited

U.S. PATENT DOCUMENTS

| | | | | |
|---|---|---|---|---|
| 9,025,885 | B2* | 5/2015 | Alpert | G06K 9/481 |
| | | | | 348/208.99 |
| 9,036,033 | B2* | 5/2015 | Lee | H04N 5/23254 |
| | | | | 348/169 |
| 9,286,691 | B2* | 3/2016 | Yu | G06T 5/003 |
| 2008/0112630 | A1 | 5/2008 | Nestares et al. | |
| 2010/0225768 | A1 | 9/2010 | Incesu et al. | |
| 2011/0085049 | A1* | 4/2011 | Dolgin | H04N 5/23248 |
| | | | | 348/208.4 |
| 2011/0211082 | A1 | 9/2011 | Forssén et al. | |
| 2012/0093413 | A1 | 4/2012 | Kuo | |
| 2013/0033612 | A1* | 2/2013 | Wu | G06T 5/002 |
| | | | | 348/208.6 |

OTHER PUBLICATIONS

A.J. Crawford, et al., "Gradient Based Dominant Motion Estimation with Integral Projections for Real Time Video Stabilisation", Dept. of Electr. Eng., Dublin Univ., Ireland, 2003, 4 pages.

Yeou-Min Yeh, et al., "A Digital Camcorder Image Stabilizer Based on Gray Coded Bit-plane Block Matching", in Input/Output and Imaging Technologies II, Yung-Sheng Liu, et al., Proceedings of SPIE vol. 4080, 2000, pp. 112-120.

Sarp Ertürk, "Real-Time Digital Image Stabilization Using Kalman Filters", Real-Time Imaging, vol. 8, 2002, pp. 317-328.

Christopher Geyer, et al., "Geometric Models of Rolling-Shutter Cameras", EECS Department, University of California, Berkeley, 2005, pp. 1-8.

Sebastiano Battiato, et al., "SIFT Features Tracking for Video Stabilization", 14$^{th}$ International Conference on Image Analysis and Processing (ICIAP 2007), 2007, 6 pages.

Won-ho Cho, et al., "Affine Motion Based CMOS Distortion Analysis and CMOS Digital Image Stabilization", IEEE Transactions on Consumer Electronics, vol. 53, No. 3, Aug. 2007, pp. 833-841.

Won-ho Cho, et al., "CMOS Digital Image Stabilization", IEEE Transactions on Consumer Electronics, vol. 53, No. 3, Aug. 2007, pp. 979-986.

Nedret Ozay, et al., "Automatic TV Logo Detection and Classification in Broadcast Videos", 17$^{th}$ European Signal Processing Conference (EUSIPCO 2009), 2009, pp. 839-843.

Touraj Tajbakhsh, "Real-Time Global Motion Estimation for Video Stabilization", SPIE-IS&T, vol. 7244, 2009, 12 pages.

Simon Baker, et al., "Removing Rolling Shutter Wobble", Microsoft Corporation, 2010, pp. 1-8.

M.J. Tanakian, et al., "Digital Video Stabilization System by Adaptive Fuzzy Filtering", 19$^{th}$ European Signal Processing Conference (EUSIPCO 2011), 2011, pp. 318-322.

Matthias Grundmann, et al., "Calibration-Free Rolling Shutter Removal", Proceedings of IEEE Conference on Computational Photography (ICCP), 2012, pp. 1-8.

* cited by examiner full-frame DML

METHOD FOR STABILIZING A FIRST SEQUENCE OF DIGITAL IMAGE FRAMES AND IMAGE STABILIZATION UNIT

BACKGROUND

Field of the Disclosure

The present disclosure relates to a method for stabilizing a first sequence of digital image frames and a corresponding image stabilization unit.

Description of Related Art

In the past years, the use of video acquisition devices has dramatically increased, due to the decrease in costs, considerable improvements in performances and increased storage capabilities. Nowadays anybody can easily record high quality video sequences on mobile devices. However the viewing experience is often disappointing.

As opposed to professional or semi-professional videographers, casual video enthusiast seldom use mechanical stabilization apparatus such as wheeled dollies, Steadicam or even tripods. Most of the time, they only possess lightweight handheld devices such as compact digital camcorders or smartphones, which can be hard to maintain steady. They want to capture spontaneous moments (e.g. baby's first steps) in which planning or retake are by definition impossible. Resulting footage can be difficult to watch, due to the moving of the camera to maintain the subject on screen and shakiness. However, since home videos record precious memories, they cannot be summarily discarded.

Video shakiness also deteriorates the performance of applications such as video compression, video surveillance and video restoration. Therefore, with the increasing prevalence of digital visual media, digital video stabilization techniques have been steadily gaining in importance.

Hence, there is a need for providing an improved method for stabilizing images and an improved image stabilization unit.

SUMMARY

A method for stabilizing a first sequence of digital image frames is provided including determining a dominant motion vector of a dominant motion layer of said sequence; determining a first part of the dominant motion vector representative of an intended motion in said sequence; determining a second part of the dominant motion vector representative of an unintended motion in said sequence; and generating a second sequence from the first sequence based on the second part.

Further, an image stabilization unit for stabilizing a first sequence of digital image frames is provided including a processor configured to determine a dominant motion vector of a dominant motion layer of said sequence; to determine a first part of the dominant motion vector representative of an intended motion in said sequence; and to determine a second part of the dominant motion vector representative of an unintended motion in said sequence; and a frame renderer configured to generate a second sequence from the first sequence based on the second part.

In addition, a computer program including computer-program instructions is provided, which when executed by a computer, cause the computer to perform a method including determining a dominant motion vector of a dominant motion layer of a sequence of digital images; determining a first part of the dominant motion vector representative of an intended motion in said sequence; determining a second part of the dominant motion vector representative of an unintended motion in said sequence; and generating a second sequence from the first sequence based on the second part.

The foregoing paragraphs have been provided by way of general introduction, and are not intended to limit the scope of the following claims. The described embodiments, together with further advantages, will be best understood by reference to the following detailed description taken in conjunction with the accompanying drawings. The elements of the drawings are not necessarily to scale relative to each other.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
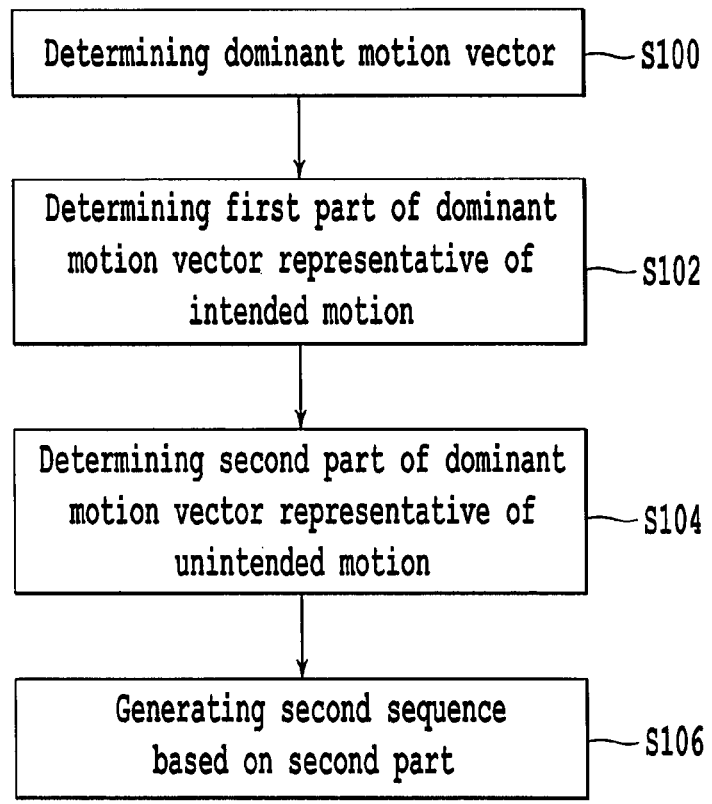
FIG. 1 shows schematically a flow diagram of a method according to an embodiment of the invention.

Referring now to the drawings, wherein like reference numerals designate identical or corresponding parts throughout the several views, in FIG. 1 a schematic flow diagram of a method for stabilizing a first sequence of digital image frames is depicted.

In a step S100 a dominant motion vector (DMV) of a dominant motion layer (DML) of said sequence is determined.

The "dominant motion" should only consists of global movements, but not include local movements. It might be interpreted as the "camera movement". Local movements might result from small objects that move independently.

In a dominant motion layer only those parts of an image should be included that show a sufficient amount of features, so that a certain degree of certainty can be achieved that indeed a motion is detected.

This might be realized by using an output of a local motion estimator (LME) to estimate inter-frame motion, for instance, by using 3D hierarchical Block Matching with integer pixel precision (similar to the algorithm described in F. Mohanna, M. Tanakian, Mr. Rezaei, "Digital video stabilization system by adaptive fuzzy filtering", Journal of Communication and Computer, vol. 7, no. 1, 2010). Other techniques can be employed although quantization may be used to keep computation tractable for subpixel valued vectors such as Optical Flow field.

Motion estimation for video stabilization should allow estimation of jitter that stems from camera unsteadiness. However, camera motion is more constraining to estimate than dominant motion, which can be a combination of both camera and apparent object behavior.

The dominant motion determination or estimation iterates over computation of dominant motion vector and dominant motion layer to remove outliers such as moving objects and texture-less areas.

A 2D translational dominant motion vector can be used as described in F. Mohanna (cf. above) or in T. Tajbakhsh, "Real-time global motion estimation for video stabilization", in Proc. SPIE, Real-Time Image and Video Processing, 2009, vo. 72440B, pp. 72440B-72440B-12 for computational simplicity and to forbid frame distortion.

The DML is represented as a matrix $DML_t$, which elements might be valued from 0 for outliers to 1 for inliers, allowing for partial membership.

A backward DMV is computed as a weighted sum of local backward motion vectors in a block-based backward motion field (from time t to time t−1) $BMV_t$:

$$DMV(t) = \sum_v H(v)v \quad (1)$$

with H: motion histogram, obtained by accumulating weights $W_t$ in one bin for each motion vector v=(dx,dy) and normalized to [0,1]. A Gaussian spatial prior probability $W_g$ might be used to give more importance to vectors close to the centre of the frame as they are more likely to belong to the DML. Element-wise multiplication yields the total weight $W_t = W_g \cdot DML_t$.

Outliers pruning might be used to remove spurious motion vectors in smooth areas and for moving objects. Hence, the dominant motion vector can then be computed by a weighted combination of all valid vectors which constitute the dominant motion layer (DML). With the proposed algorithm a vector corresponding to the centre of mass of the histogram is calculated with subpixel accuracy, which is able to stabilize a wider variety of videos than a maximum of the motion histogram, notably sequences with zoom.

Elements of $DML_0$ might be initialized as 1. At a current frame $F_t$, vectors in low-textured areas are weighted out by $W_e$, thresholded norm of intensity gradients, yielding a first estimate of the DML, $DML_t^0 = DML_{t-1} \cdot W_e$. Then for n=1 to $N_{iter}$, the DMV is successively estimated according to equation (1) and the DML is updated as:

$$DML_t^n = (\beta \cdot DML_t^{n-1} + (1-\beta)\Theta_v^n) \cdot W_e \quad (2)$$

The update step consists in blending the previous DML estimate with the current detected motion inliers (with β=0.5), a binary matrix such that $\Theta_v^n(i, j)=1$ if $\|BMV_t(i, j)-DMV(t)\|^2 < \theta_v^n$.

The threshold $\theta_v^n$ is computed as $\theta_v^n = 1 + \Sigma_v H(v)\|v-DMV(t)\|^2$. This thresholding operation weights out vectors that do not participate to the DMV computation while enforcing robustness to inconsistencies in edge detection and inaccurate inliers. As value of $N_{iter}=1$ might be enough to remove most of the influence of moving objects, while not pruning too many vectors in degenerate motion cases (such as zooming). In order to completely remove the influence of points that are the more likely to be outliers, DML values below 0.25 might be set to 0. Similarly, to fully account for points that belong to the DML, values above 0.75 might be set to 1.

The goal of DML estimation is twofold: pruning outliers and enforcing temporal consistency of the DMV. When a moving object comes closer to the camera, it is avoided to estimate its motion as the dominant one, which would result in causing jitter to be wrongly estimated and generating artifacts (sudden jumps of the image) in the stabilized output.

Hence, given the estimated DML at a previous time instant, the proposed dominant motion layer estimation (DMLE) procedure iteratively refines a current estimate while computing a time-dependent dominant motion vector DMV(t) by weighting out motion vectors that are beyond a certain distance to the dominant motion vector DMV. Outliers can be pruned with an adaptive threshold based on an estimate of the variance in the motion histogram (computed as mean error). With this method the influence of moving objects in the scene is effectively removed, even if they get close enough to the camera to occupy most of the screen. In the proposed outlier pruning method a temporally coherent evolution of the dominant motion layer DML is enforced.

Then, in a step S102 a first part of the dominant motion vector representative of an intended motion in said sequence is determined.

In a step S104 a second part of the dominant motion vector representative of an unintended motion in said sequence is determined.

Figure 3:
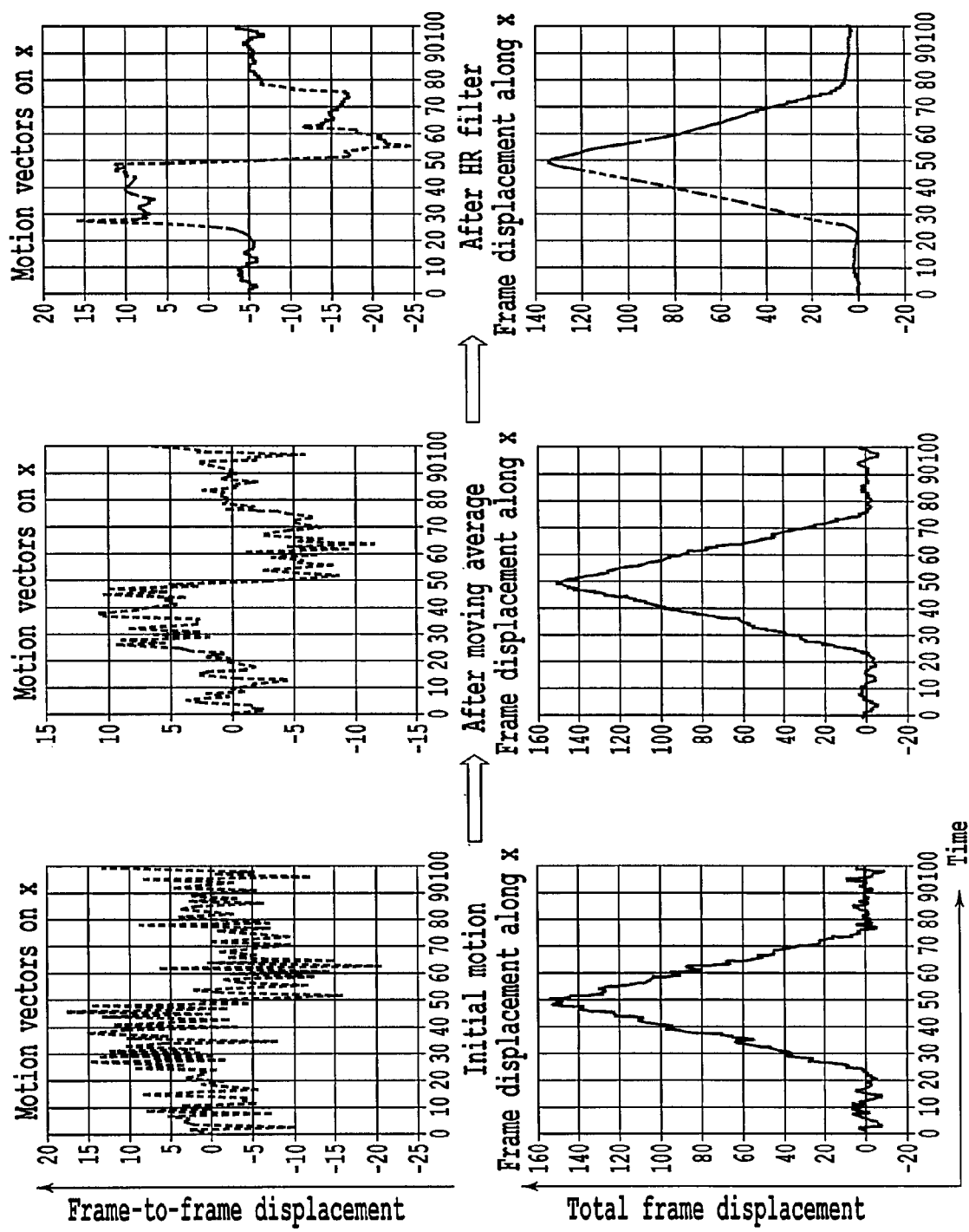
FIG. 3 shows schematically a determination of a first part of the dominant motion vector representative for an intended motion according to an embodiment of the invention.

The first part might be referred to by "intended motion $DMV_i$" and the second part might be referred to by "unintended motion $DMV_u$". Hence, the DMV is decomposed into $DMV(t)=DMV_i(t)+DMV_u(t)$. The unintended second part might be treated as additive noise (as depicted in FIG. 3).

Then, in a step S106 a second sequence is generated from the first sequence based on the second part.

Hence, the unintended, second part of the motion is used to estimated an amount of correction for stabilizing each frame.

In the translational motion model case, digital image frames are spatially displaced inversely to the unintended, second part (also referred to as "jitter") so as to cancel its effects.

Figure 2:
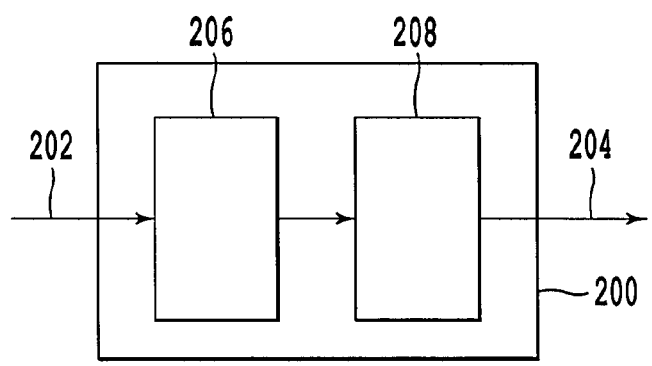
FIG. 2 shows schematically a block diagram of an image stabilization unit according to an embodiment of the invention.

FIG. 2 depicts a schematic block diagram of an image stabilization unit 200 according to an embodiment of the invention is depicted.

The image stabilization unit 200 generates a second, stabilized, sequence 204 based on the first sequence 202 of digital image frames.

The first sequence is input into a processor 206 adapted to determine a dominant motion vector of a dominant motion layer of said sequence; to determine a first part of the dominant motion vector representative of an intended motion in said sequence; and to determine a second part of the dominant motion vector representative of an unintended motion in said sequence.

The output of the processor 206 is input into a frame renderer 208 which is adapted to generate the second sequence from the first sequence based on the second part.

To obtain a smooth intended motion, a low pass filter is applied to the dominant motion vector DMV. A two-step filter might be used (see FIG. 3) which first applies a moving average to the DMV before an adaptive infinite impulse response (IIR) filter:

$$DMV_i(t) = \alpha(t) DMV_i(t-1) + (1-\alpha(t))\overline{DMV}(t) \qquad (3)$$

The smoothing parameter α of the IIR filter can be adapted depending on the nature of the motion so as to follow more closely intentional motion.

The averaging results in $$\overline{DMV}(t) = \frac{1}{p+k+1} \sum_{s=t-p}^{t+k} DMV(v).$$

For real-time applications a causal filter is applied, so k can be set to 0. Using only the next frame improves stability of the system while keeping a low latency, hence k and p might be set to 1.

In order to follow more closely intentional motion, the IIR filter parameter α can be adapted depending on motion statistics (cf. F. Mohanna, see above): the intentional motion energy $E_i(t)$ is $$E_i(t) = \left| \frac{1}{N} \sum_{s=t+T-N+1}^{t+T} DMV(s) \right| \qquad (4)$$

with a delay in the system T=1 (or T=0 for a causal filter at the cost of higher delay in adaptation) and N=7 (using less samples at the start of the video, and similarly the unintended energy is $$E_u(t) = \frac{1}{N-1} \sum_{s=t+T-N+2}^{t+T} |DMV(s) - DMV(s-1)|. \qquad (5)$$

Motion classification as in Y. Yeh, S.-J. Wang, and H.-C. Chiang, "Digital camcorder image stabilizer based on gray-coded bit-plane block matching," in Proc. SPIE, Input/Output and Imaging Technologies, 2000, vol. 4080, pp. 112-120, might be used, where the motion regime $R_t$ can be either temporally correlated if both $E_u(t)/E_i(t)<K_1$ and $E_i(t)>K_2$ or random-like otherwise.

$K_1$ might be set to 0.5 and $K_2$ might be set to 3. At valid regime transitions, i.e. $R_{t-1} \neq R_t$ and $R_{t+1}=R_t$, the value of α might be lowered from a maximum $\alpha_{max}=0.9$ to $\alpha_{min}=0.5$ in two frames, with intermediate value $\alpha_{med}=(\alpha_{max}+\alpha_{min})/2$, and then increased back to $\alpha_{max}$ likewise (ignoring regime transitions occurring while α is modified). The idea is to follow intended motion changes while maintaining a smooth motion otherwise. Motion classification and adaptation of α are done independently on X and Y dimensions.

Figure 4A:
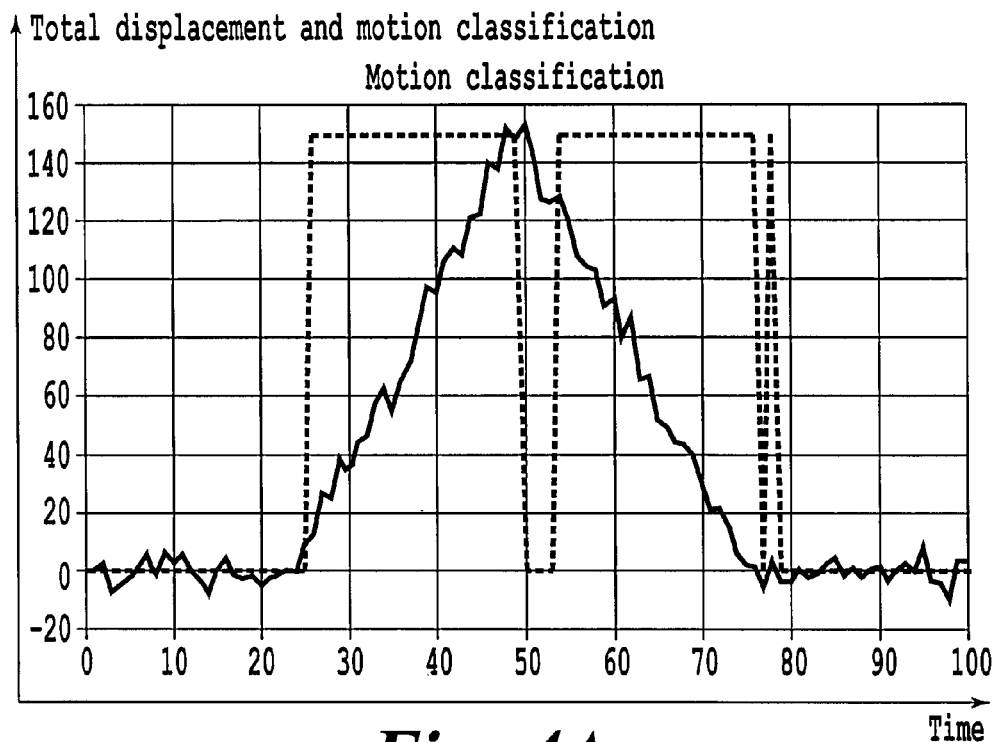
FIGS. 4a and 4b show schematically how a motion is classified in an intended and an unintended motion according to an embodiment of the invention.
Figure 4B:
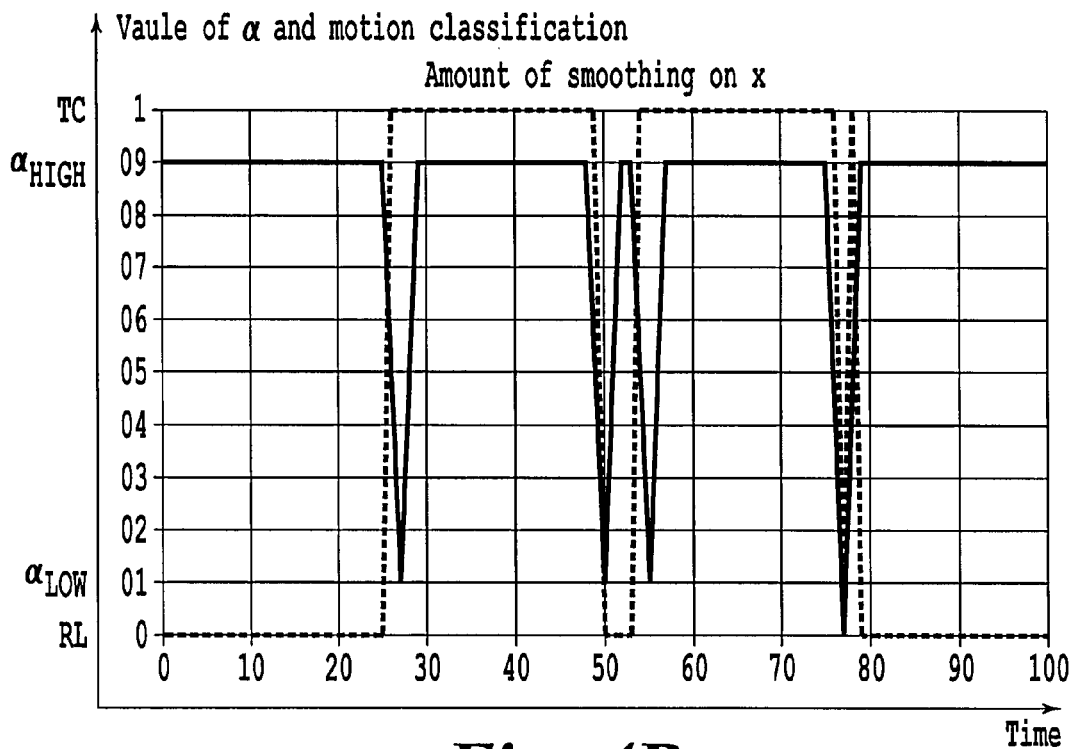

Hence, the motion might be classified into two categories, namely temporally correlated (TC) motion, which is considered as intentional, and random-like (RL) motion, in which the jitter predominates an otherwise static intended camera motion (see FIGS. 4a and 4b for further details of motion classification and alpha adaptation mechanism).

FIG. 3 shows the inter-frame motion vectors along time in the top row and dominant trajectories in the second row (which is the accumulated dominant motion vectors (or the integrated value of the dominant motion vectors), so as to estimate the total displacement). Using the two-step filter allows for tuning/deactivation of one step depending of the requirements of the system for integration. Although the moving average step could be skipped or made purely causal by using only previous samples of the DMV, it is observed experimentally that including information from the next frame significantly improves the stability of the system compared to IIR filter used only.

This adaptation scheme allows the technique to follow closely changes in the statistics of the intentional motion while removing unwanted jitter. A simple adaptation of the smoothing coefficient can be used, using the sum of the last two values of DMV. If the sum is low, then smoothing is high (intentional motion is considered as static so the video needs to be strongly stabilized), if the sum is high, then smoothing is low (a large intentional motion should be followed). Using only the last two time samples does not seem to be very robust to longer term variations. Moreover using only information from the past and current frame causes a higher delay in adaptation. To make up for these defects, more samples of the motion in the past are used as well as samples in the next frames (this can be parameterized if no samples from future frames are accessible, due to system requirements). Motion classification and parameter adaptation are performed independently for each dimension.

Figure 5:
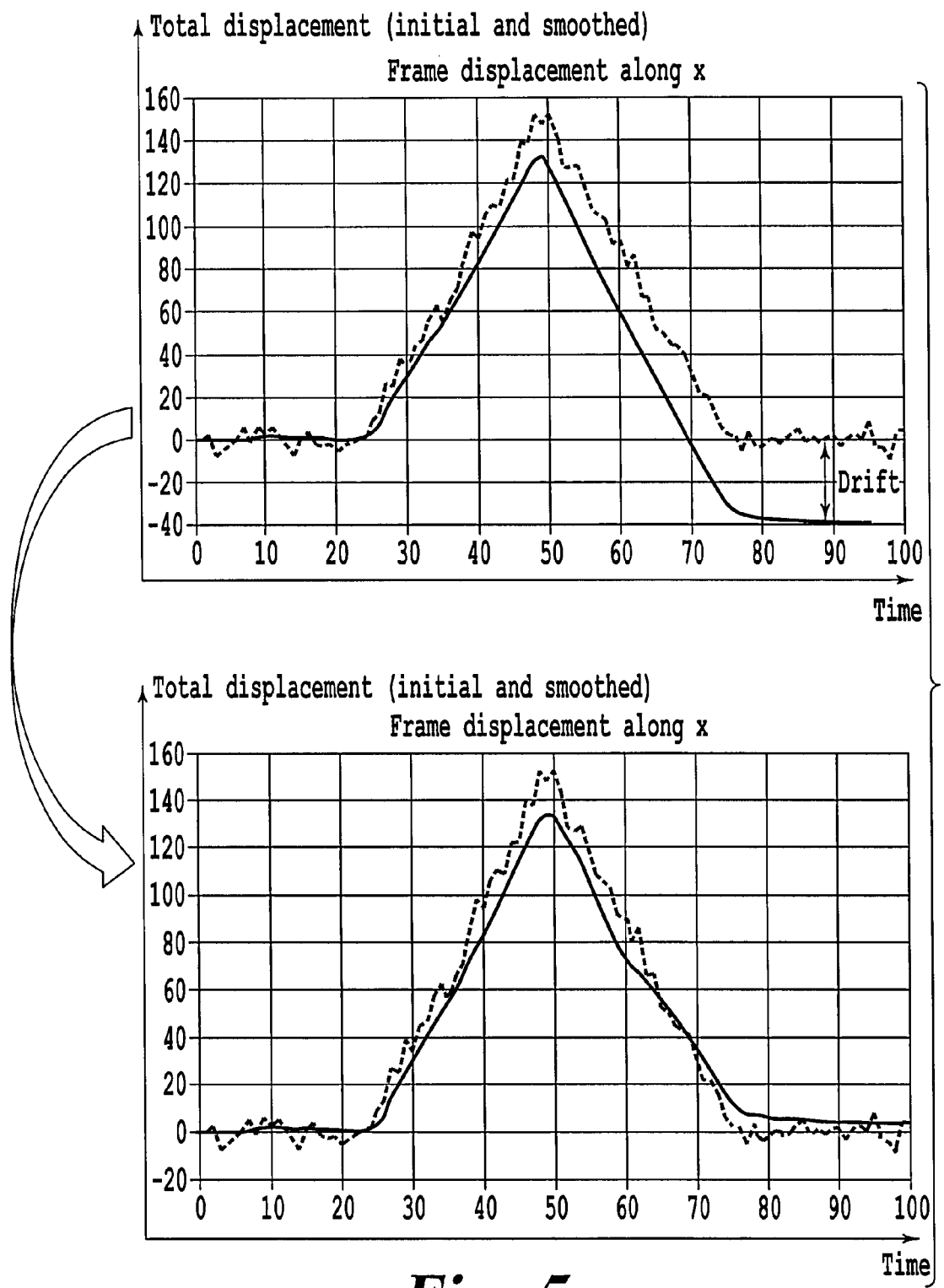
FIG. 5 shows schematically an embodiment of reducing a drift in a sequence of images according to an embodiment of the invention.

The current amount of jitter is $\Delta_u(t)=\Sigma_{s=0}^{t}DMV_u(s)$. As can be observed in FIG. 5 (top), the smooth intentional dominant trajectory $\Delta_i(t)=\Sigma_{s=0}^{t}DMV_i(s)$ can drift from the gross displacement $\Delta(t)=\Sigma_{s=0}^{t}DMV(s)$ due to motion vector integration in equation (3). In order to avoid this effect, the amount of drift between the two curves might be monitored: $\Delta_d = \Delta_u(t-1) + DMV(t) - DMV_i(t)$. If $|\Delta_d|>\theta_d$ then the intended motion vector is modified as follows: $DMV_i(t)=\Delta_u(t-1)+DMV(t)-\text{sgn}(\Delta_d)\theta_d$ and the unwanted motion is updated accordingly. Impacting drift correction on the intended motion allows for smooth correction, as the rectification is taken into account by the low-pass filter (see FIG. 5, bottom right). Drift correction is performed independently on X and Y dimensions, with $\theta_d$ set to 5% of the frame width and height, respectively.

Figures 6A, 6B:
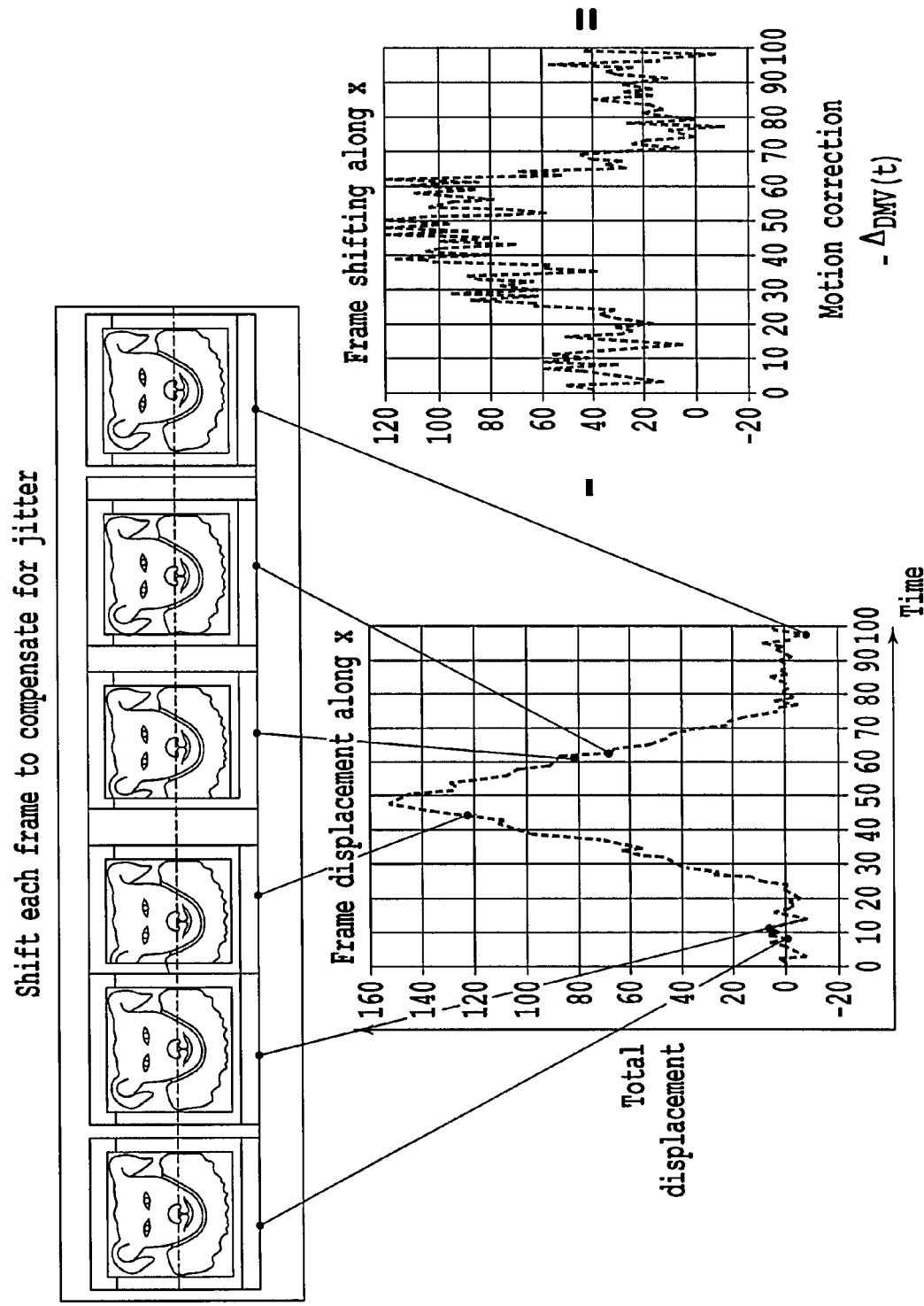
FIGS. 6A-C schematically show how a second stabilized sequence of images from the first sequence of images is generated according to an embodiment of the invention.
Figure 6C:
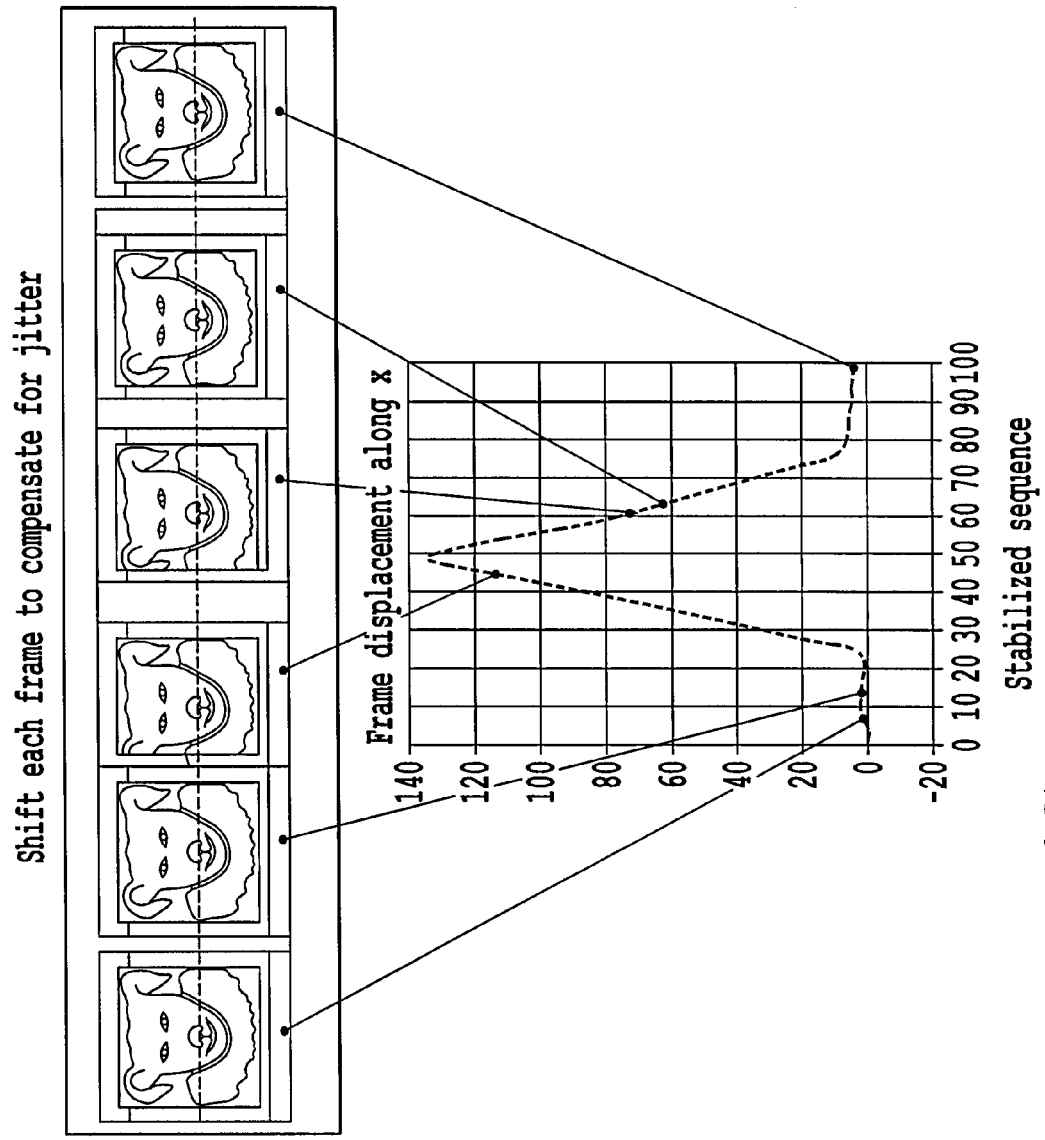

Once the unwanted jitter estimated, each frame is shifted according to the correction vector to cancel its effects and render a smooth sequence (see FIGS. 6A-C). Hence, in order to render a sequence that preserves intended motion while removing the jitter, each frame Ft is shifted by $-\Delta_u(t)$ using bilinear interpolation.

The fixed drift correction scheme allows to simply cropping the output video to mask the missing area appearing when shifting the frames. The user can set the drift correction parameter as a trade-off between smoothness and image degradation. The frame is cropped according to the value of the maximum jitter that can be compensated. Cropping is used as a solution to the missing area problem for simplicity and computational efficiency.

The frame shifting procedure is shown in FIGS. 6A-C that display a few frames from the stabilized output of the artificial sequence which motion was used to illustrate adaptive smoothing technique. Inverse sampling and bilinear interpolation are used to render each frame. The area at the frame borders correspond to the missing area introduced by artificially translating the sequence as well as the amount of unwanted jitter introduced. The black areas correspond to the revealed missing area before cropping.

There is further interest in stabilizing sequences extracted from broadcast programs containing On Screen Display (OSD), such as logos, subtitles, timers, etc. None of the video stabilization methods developed so far have integrated a means to detect OSD so as to leave it as is on the stabilized sequence, instead the OSD is transformed along with the image content, and thereby it exhibits the jittery behavior of the input sequence. To solve that problem, a logo detection (LD) unit is integrated to the image stabilization unit 200 that feeds a logo mask to the frame renderer 208, which in turns composes a stabilized frame where the OSD area remains unchanged.

A logo detection technique can be used which detects persistent edges on a time-averaged frame, corresponding to the contour of logos, and then performs morphological operations as well as geometrical and temporal consistency checks to refine the logo map.

Figure 7:
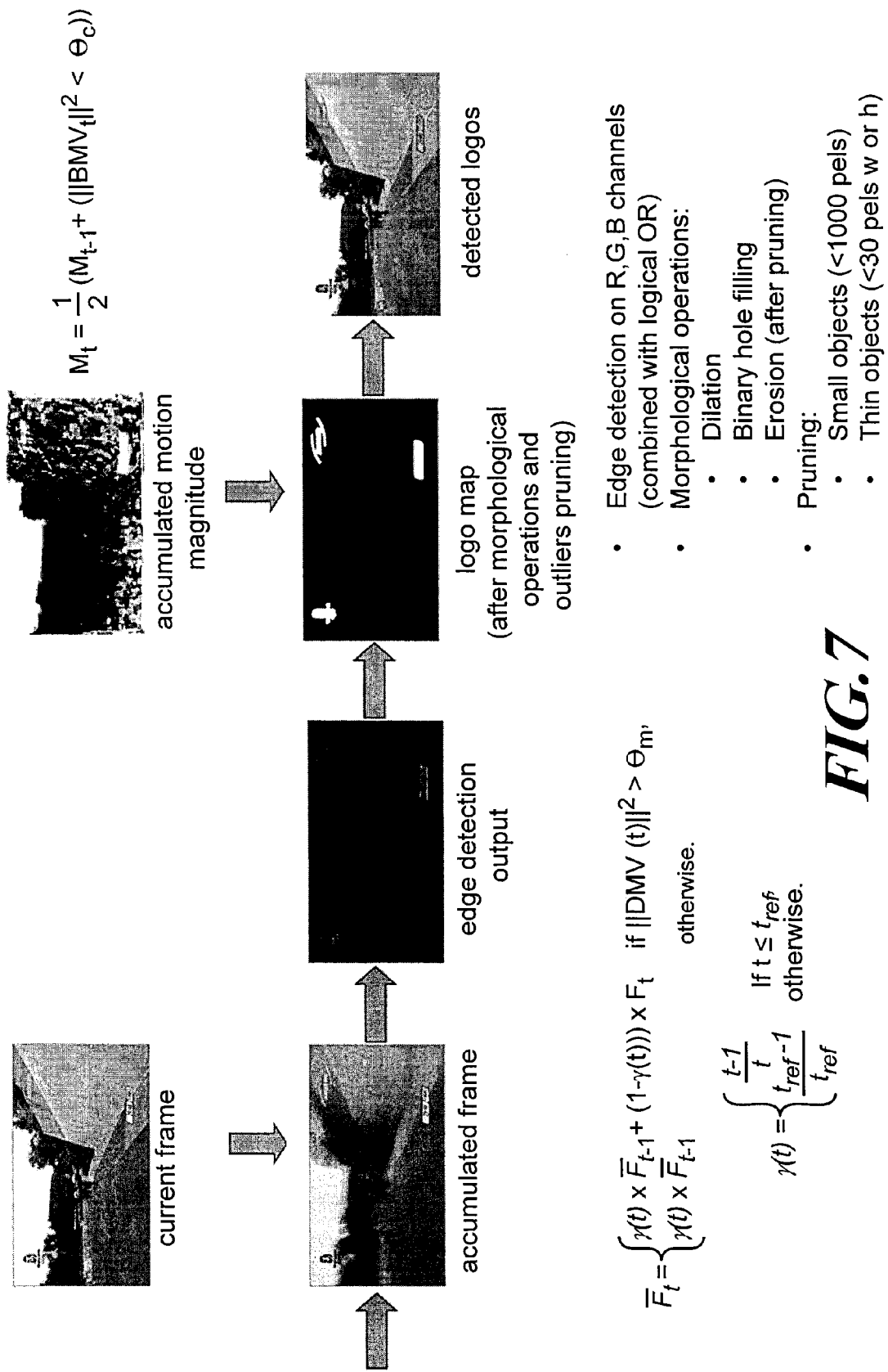
FIG. 7 shows schematically a method to detect an on screen display (logo) according to an embodiment of the invention.

Similar to N. Özay, B. Sankur, "Automatic TV logo detection and classification in broadcast videos", in Proc. European Signal Processing Conference, 2009, pp. 839-843, persistent edges can be detected on a time-averaged frame (see FIG. 7):

$$\overline{F}_t = \begin{cases} \gamma(t)\overline{F}_{t-1} + (1-\gamma(t))F_t & \text{if } \|DMV(t)\|^2 > \theta_m \\ \gamma(t)\overline{F}_{t-1} & \text{otherwise} \end{cases} \quad (5)$$

where $\gamma$ is defined as in N. Özay (see above).

Here, motion detection is performed with a threshold $\theta_m=10$, so as to accumulate frames that provide sufficient background difference to re-enforce static edges only, thus avoiding false detection. Stabilization starts at frame $t_{start}=11$ to allow time for logo detection to converge.

Hence, the logo detection procedure starts with accumulating frames for edge detection from the start of the video but neither Logo Detection nor Video Stabilization begin before a convergence delay to avoid rendering frames with falsely detected static area. The estimated DMV is used to assess if there is enough interframe motion, in which case accumulating the current frame re-enforces the logo edges only, otherwise background edges can become stronger (which can cause false detections) so only the current intensity of the average frame is attenuated in that case. This accumulation scheme also improves the convergence speed of the edge detection.

Binary edge maps obtained on each color channel of the respective frame can be combined with logical OR as the use of colors instead of intensity only improves logo contour detection. The logo area is extracted by applying dilation to merge group of pixels followed by binary hole filling. Then small or thin objects (less than a threshold $\theta_f=1000$ pixels or with a rectangle bounding box with width or height below a threshold $\theta_T=30$ pixels) are pruned.

Also objects are removed which centroids lie in a region of low motion magnitude $M_t=1/2(M_{t-1}+(\|BMV_t\|^2<\theta_c))$. An object might be deemed static if the sum of the values of $M_t$ in a 3×3 patch around its centroid is below $\theta_c=2$. Combining motion cues with image features can help prevent false detections and possibly cover a larger range of OSD. Once pruning is done, erosion might be performed.

The estimated logo map can be temporally instable; especially when a semi-transparent logo is over a low contrast area, logo detection can fail. The stability of logo maps can be enforced with a post-matching operation. For instance, the variation in size of a logo can be checked to be within a certain threshold. However some OSD can change size over time, appear and disappear. So it might be advisable to use a more flexible approach in which the pixel by pixel frame difference is computed in the static areas between the current frame after stabilization and the original previous frame to check whether detecting a logo or not improves the smoothness of the video.

Once a logo map is estimated, a stabilized frame is rendered by globally correcting for unwanted jitter while keeping the detected static area unchanged. The post-matching process computes the stabilized frame in three cases: using the current logo mask, using the previous logo mask and using no logo mask. Then image area at logo objects in the previous logo map (or no logo) and in the current logo map (or no logo) are compared in the current and previous frame. Then the current logo map is updated depending on which configuration (previous logo, current logo or no logo) yields the minimum mean frame difference. Note that frame differences are computed on intensity only for computational simplicity.

After stabilization, uncovered areas are generated between the displaced original position of the logo and the unchanged position where the logo is maintained. To fill-in the missing area, some inpainting techniques should be used, but also only a very basic mosaicking technique might be implemented. For instance, a hole filling mechanism copies data from the previous frame (excluding possible logo areas in that frame) aligned to the current frame with the intended motion and data in the non-stabilized current frame (excluding the logo area) to fill in the remaining gaps.

Many inexpensive cameras on smartphones use CMOS (complementary metal oxide semiconductor) sensors with rolling shutter. When applying video stabilization to shaky sequences taken with such devices, remaining wobbles may be observed. To extend the technique to be able to correct these defects, a Rolling Shutter Correction mechanism has been designed.

Figure 8:
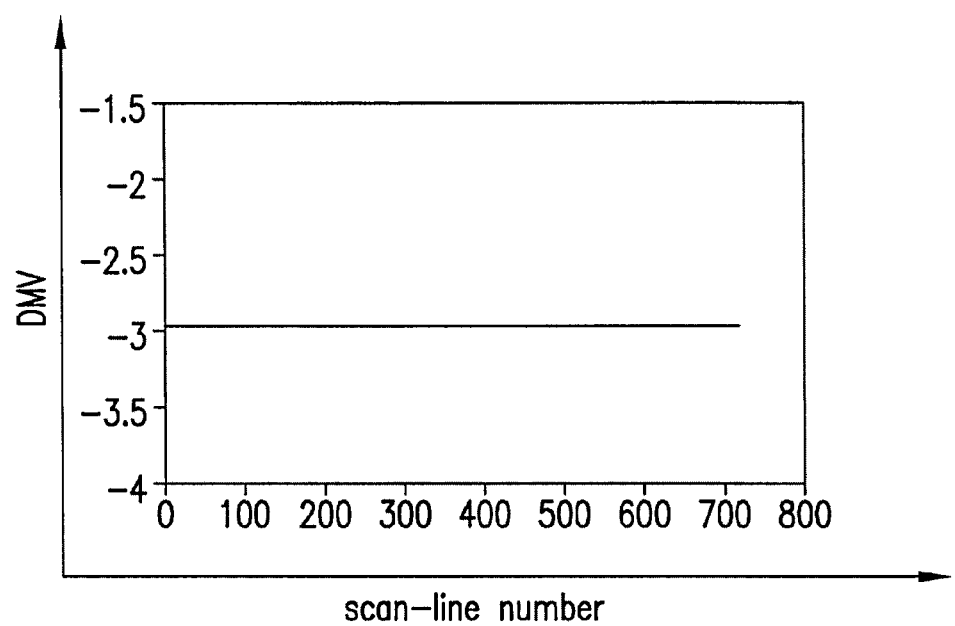
FIG. 8 shows schematically a determination of a dominant motion vector for a full-frame dominant motion layer according to an embodiment of the invention.
Figure 8:
Figure 9:
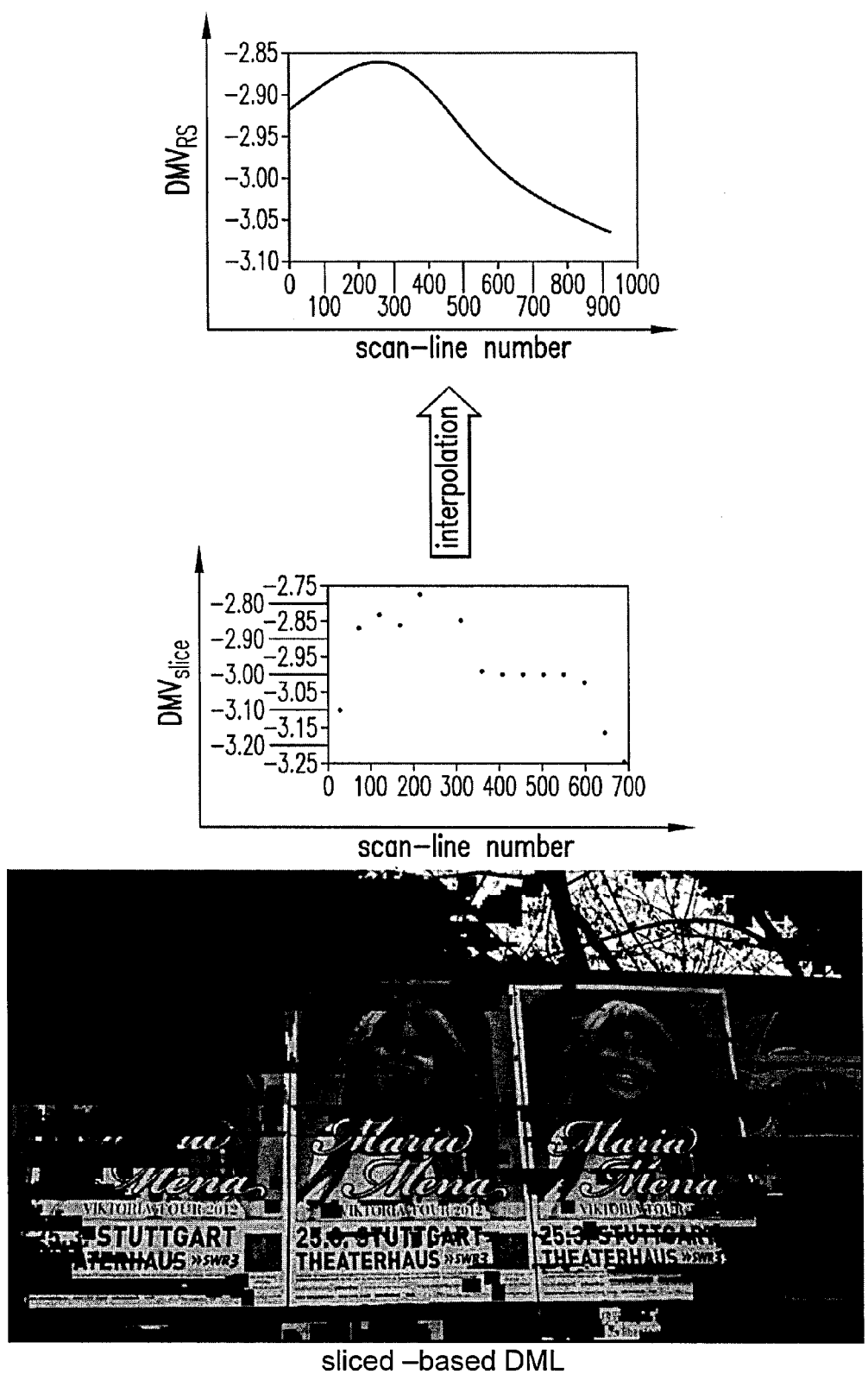
FIG. 9 shows schematically a determination of interpolated dominant motion vectors for each line of a rolling shutter image sequence.

To attenuate rolling shutter wobbles the technique is extended by interpolating samples of the DMV for each scan-line of frame $F_t$ (of height h). The $BMV_t$ (of height $h_{MV}$) is divided into $N_{slice}=15$ slices (of height $h_{slice}=h_{MV}/N_{slice}$) on which the method described above is applied to obtain a sample $DMV_{slice}(k)$ at each slice (see FIGS. 8 and 9 for a comparison of a full-frame DML with slice-based DML). Slices have an overlap of $h_{slice}/2$ for smoothness. To retain global outliers information the slice-based DMLs are averaged with a full-frame DML. Edge information is computed for the whole frame, but slice-based spatial Gaussian prior probabilities are used. Outliers might be pruned more aggressively, so that $N_{iter}=2$ might be set.

The DMV at each scan-line s at time t is computed as a mixture of sliced-based DMVs:

$$DMV(s,t) = \frac{1}{K_S} \sum_{k \in S} \lambda_k \exp - \frac{(s-c_k)^2}{2\sigma^2} DMV_{slice}(k) \quad (6)$$

where $K_s$ is a normalizing factor, $$\sigma = \frac{3h}{N_{slice}},$$

$c_k$ and $\lambda_k$ are the middle row and the sum of DML values (normalized to add to 1) in the $k^{th}$ slice, respectively, and S is the set of valid slices (for which $$\lambda_k \geq \frac{1}{N_{slice}}).$$

The motion of each row is aligned to the intentional motion $DMV_i$ at the mid-frame scan-line by shifting each scan-line as e.g. in S. Baker, E. Bennett, S. Kang, and R. Szeliski, "Removing rolling shutter wobble," in IEEE Conf. Computer Vision and Pattern Recognition, 2010, pp. 2392-2399.

Hence, the motion estimation can be based on a global translational model and re-use the dominant motion layer estimation on slices of the original video and can interpolate slice-based dominant motion vectors using Gaussian mixture.

The dominant motion vector DMV of the middle scan-line is computed first and the rest of the slices is processed from the center to the border. The obtained DML is averaged with a full frame DML computed as before so as to include global information to the process, such as weighting out of moving objects. The sliced-based DML computation is a refinement of the full-frame DML computation presented above, in which the DMV at each slice adds local motion information, but should still belong to the full-frame DML. Edge detection is performed only on the full frame and slices of the edge map are used for each sliced DML. But spatial regularization is performed at the slice level, by using Gaussian weights centered at each slice.

Then the DMVs obtained at each slice of the frame are interpolated, to have one sample for each scan-line. A Gaussian mixture of DMVs is used to generate intermediate samples.

An additional weight is given to each slice depending on the amount of valid vectors in the DML. Slices with not enough valid vectors are deemed not valid and are not used for interpolation. A sample of the DMV is obtained at each scan-line by mixing the sliced-based DMVs with coefficients made of those DML-based weights multiplied by Gaussian weights centered at the middle of the corresponding scan-line. To avoid errors at the boundaries of the frame (up and down) during the alignment step, and to avoid using a calibration procedure to estimate the fraction of time the sensor is active so as to adjust the samples of dominant motion across frames, the motion is interpolated for negative scan-lines on top of the frame and scan-line numbers greater than h at the bottom of the frame.

The proposed method is real-time capable, exhibits low memory costs and needs no a priori knowledge of sensor parameters. It enables a low-cost efficient stabilization of sequences with zoom or large moving objects with a translational motion model.

An adaptive video stabilization system is presented using a translational motion model which is able to efficiently stabilize a wide variety of videos (without a priori knowledge of the camera used) while retaining the videographer's intended motion. Existing local motion estimation technology is re-used to compute a dominant motion vector that represents the motion in one temporally coherent motion layer in the scene. This ability to focus on one motion layer allows the proposed technique to efficiently stabilize a video even in difficult cases for existing techniques based on purely translational stabilization, such as scenes with large moving objects or large depth variation, in which case the video is stabilized with respect to the motion layer on which the motion estimator focuses.

The stabilization process retains intended motion in the scene by using adaptive low-pass filtering with motion classification and on-line dominant trajectory drift correction. The proposed adaptive filtering is parameterizable so that it can be adapted to the latency constraints of the system in which our technique is integrated, albeit to the cost of a larger delay in following the intended motion which can cause drifting. The drift correction mechanism applies the rectification to the intended motion directly so as to generate a smooth adaptation of the trajectory and not to generate jumps in the output video unlike existing techniques.

The stabilized video is generated by shifting each frame inversely to the amount of estimated jitter so as to cancel its effect. Frame shifting reveals unknown pixel information at the border of the video. To mask missing areas the output video is cropped of a parameterizable quantity that is determined by the maximum acceptable drift in the dominant trajectory.

Rolling shutter artifacts are corrected in videos which motion is assumed to be planar, fronto-parallel, with a motion interpolation technique based on the dominant motion estimator and scan-line by scan-line frame shifting. For sequences with simple motion this adds an increased steadiness to the output.

Furthermore, a logo detection mechanism has been integrated in the system and method so as to stabilize TV content such as sports events or high action movies while leaving the static OSD unchanged.

Figure 10:
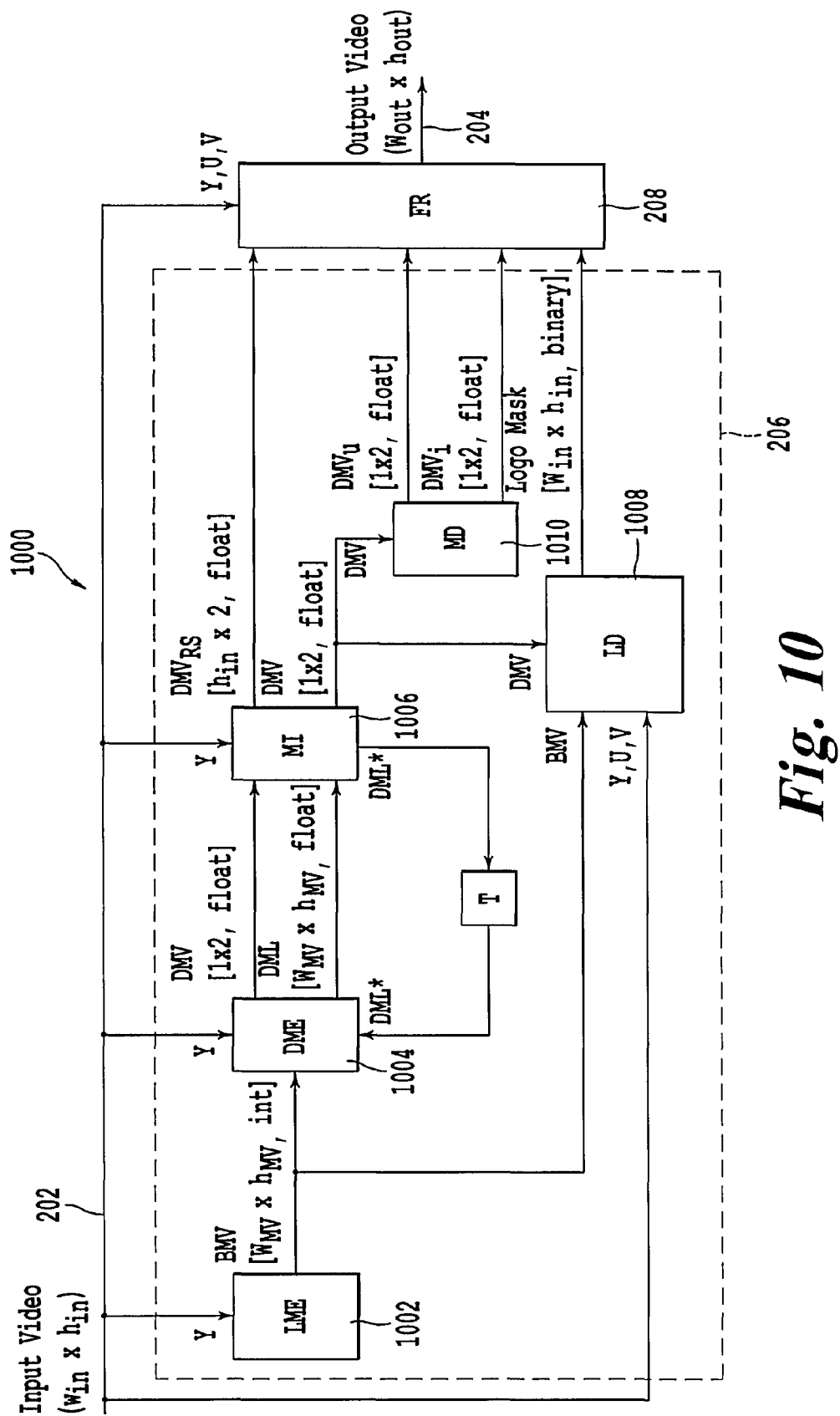
FIG. 10 shows schematically a block diagram of an image stabilization unit according to a further embodiment of the invention.

In FIG. 10 an image stabilizing unit 1000 according to a further embodiment is depicted.

The output of a local motion estimator (LME) 1002 is used by a dominant motion estimation (DME) unit 1004 to estimate inter-frame motion. Motion decomposition is performed by a motion decomposition (MD) unit 1010. To correct for rolling shutter wobble a motion interpolation (MI) unit 1006 is used integrated with dominant motion estimation and to adapt the frame renderer (FR) 208 to align each scan-lines. To process broadcast videos containing logos, a logo detection (LD) unit 1008 is used, which supplies a map with static areas to be preserved during frame rendering to the frame renderer 208. The dominant motion estimation unit 1004, the motion decomposition unit 1010, the motion interpolation unit 1006 and the logo detection unit 1008 might be integrated in the processor 206.

In so far as embodiments of the invention have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present invention.

Obviously, numerous modifications and variations of the present disclosure are possible in light of the above teachings. It is therefore to be understood that within the scope of the appended claims, the invention may be practiced otherwise than as specifically described herein.

The present application claims priority to European Patent Application 13 000 144.9, filed in the European Patent Office on Jan. 11, 2013, the entire contents of which being incorporated herein by reference.

The invention claimed is:

1. A method for stabilizing a first sequence of digital image frames comprising:
   determining a dominant motion vector of a dominant motion layer of said first sequence;
   determining a first part of the dominant motion vector representative of an intended motion in said first sequence;
   determining a second part of the dominant motion vector representative of an unintended motion in said first sequence;
   generating a second sequence from the first sequence based on the second part, the dominant motion vector being determined based on a weighted combination of all vectors that constitute the dominant motion layer;

refining a current estimate of the dominant motion layer by weighting out motion vectors that are beyond a predetermined distance from the dominant motion vector, the dominant motion layer being represented as a matrix including values between a first value and a second value, the first value in the matrix indicating an outlier, and the second value in the matrix indicating an inlier;

setting a third value in the matrix to the first value when the third value is below a first predetermined threshold; and setting a fourth value in the matrix to the second value when the fourth value is above a second predetermined threshold.

2. The method according to claim 1 wherein said determining the first part includes applying a low pass filter to the dominant motion vector.

3. The method according to claim 2, wherein said applying the low pass filter includes applying a moving average to the dominant motion vector.

4. An image stabilization apparatus for stabilizing a first sequence of digital image frames comprising:

a processor configured:
to determine a dominant motion vector of a dominant motion layer of said first sequence;
to determine a first part of the dominant motion vector representative of an intended motion in said first sequence;
to determine a second part of the dominant motion vector representative of an unintended motion in said first sequence;
to refine a current estimate of the dominant motion layer by weighting out motion vectors that are beyond a predetermined distance from the dominant motion vector, the dominant motion layer being represented as a matrix including values between a first value and a second value, the first value in the matrix indicating an outlier, and the second value in the matrix indicating an inlier;
to set a third value in the matrix to the first value when the third value is below a first predetermined threshold; and
to set a fourth value in the matrix to the second value when the fourth value is above a second predetermined threshold; and a frame renderer configured to generate a second sequence from the first sequence based on the second part, wherein the dominant motion vector is determined based on a weighted combination of all vectors that constitute the dominant motion layer.

5. A non-transitory computer-readable storage medium including computer-program instructions, which when executed by a computer, cause the computer to perform a method comprising:

determining a dominant motion vector of a dominant motion layer of a first sequence of digital images;

determining a first part of the dominant motion vector representative of an intended motion in said first sequence;

determining a second part of the dominant motion vector representative of an unintended motion in said first sequence;

generating a second sequence from the first sequence based on the second part, the dominant motion vector being determined based on a weighted combination of all vectors that constitute the dominant motion layer;

refining a current estimate of the dominant motion layer by weighting out motion vectors that are beyond a predetermined distance from the dominant motion vector, the dominant motion layer being represented as a matrix including values between a first value and a second value, the first value in the matrix indicating an outlier, and the second value in the matrix indicating an inlier;

setting a third value in the matrix to the first value when the third value is below a first predetermined threshold; and setting a fourth value in the matrix to the second value when the fourth value is above a second predetermined threshold.

6. The method according to claim 1, wherein the first value is 0 and the second value is 1, wherein the first predetermined threshold is 0.25, and wherein the second predetermined threshold is 0.75.

7. The method according to claim 1, wherein the first predetermined threshold and the second predetermined threshold are values between the first value and the second value.

* * * * *